March 10, 1931.   E. A. HARDISON   1,795,719
BRAKE ACTUATING MECHANISM
Filed June 6, 1928
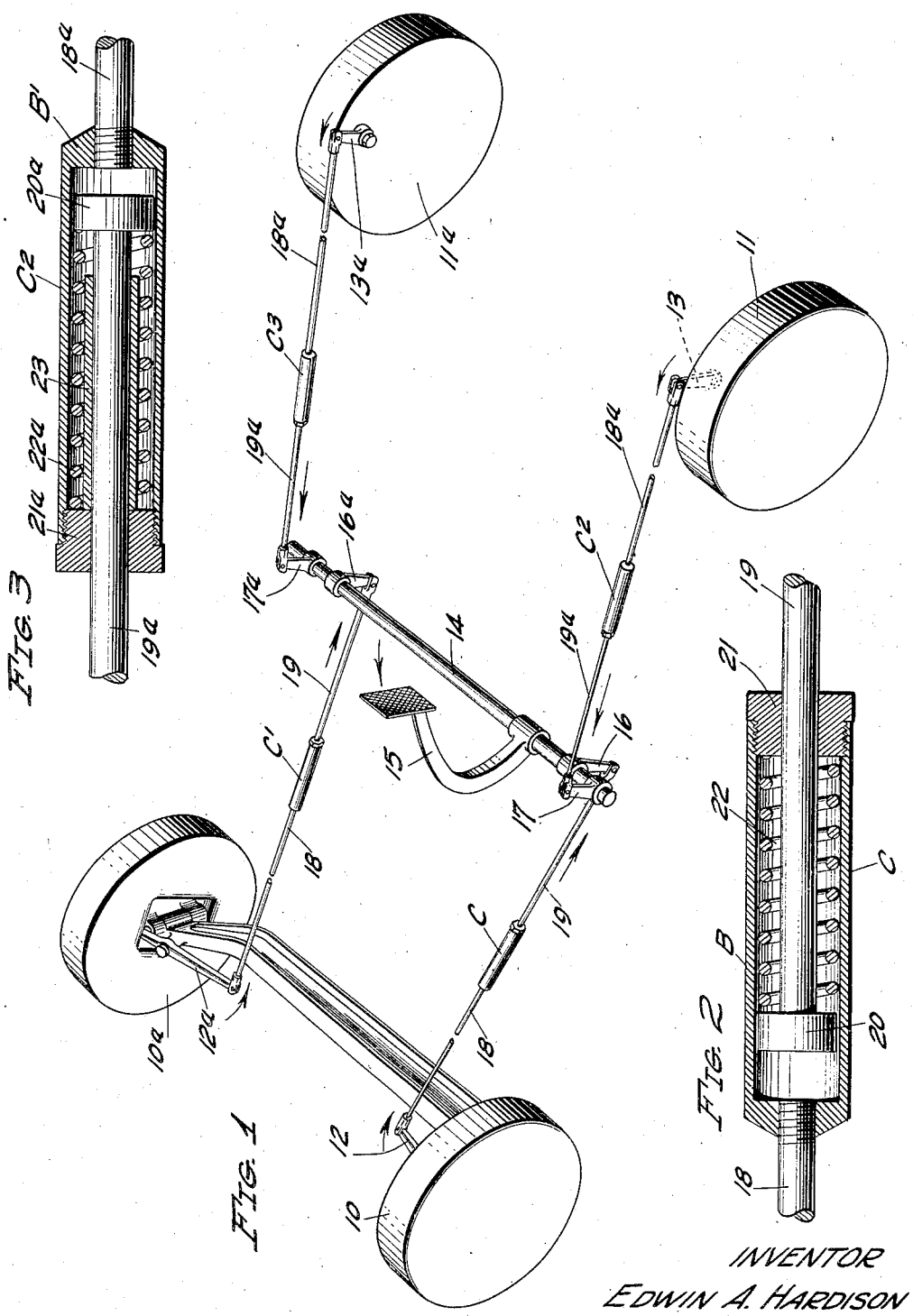
INVENTOR
EDWIN A. HARDISON
BY *Munn & Co.*
ATTORNEY Patented Mar. 10, 1931

1,795,719

UNITED STATES PATENT OFFICE

EDWIN A. HARDISON, OF LOS ANGELES, CALIFORNIA

BRAKE-ACTUATING MECHANISM

Application filed June 6, 1928. Serial No. 283,293.

My invention relates to brake actuating mechanisms particularly adapted, although not necessarily, for four wheel vehicle brakes of both the mechanical and hydraulic types. Although four wheel brakes of these types such as are at present used on automobiles are highly efficient when in a state of perfect adjustment, they fail in many instances to retain such condition of adjustment for a reasonable period of time, to the end that they soon become a source of danger and are the cause of serious accidents, due to the fact that the brakes may take hold unequally or the front wheel brakes become effective in advance of or to a greater extent than the rear wheel brakes, with the attendant liability of overturning the automobile or throwing it into an uncontrollable skid.

It is a purpose of my invention to provide a simple, dependable and easily adjustable brake actuating mechanism by which the above recited disadvantages will be entirely overcome and the brakes when once perfectly adjusted maintained in such condition of adjustment indefinitely.

It is a further purpose of my invention to provide a brake actuating mechanism by which only a predetermined maximum operating force equivalent to a service application insufficient to cause the front wheel brakes to grab or lock can be transmitted thereto, while at the same time permitting sufficient operating force to be transmitted to the rear wheel brakes to effect an emergency application thereof, thereby obtaining maximum braking efficiency consistent with safety and reducing to a minimum the possibility of skidding or overturning the automobile when effecting a brake application in an emergency.

I will describe only one form of brake actuating mechanism embodying my invention and will then point out the novel features in claims.

In the accompanying drawing,

Fig. 1 is a perspective view illustrating one form of brake actuating mechanism embodying my invention, in association with a set of four wheel vehicle brakes which are shown for the purpose of illustration only, as being of the internal expanding mechanical type;

Fig. 2 is an enlarged view in longitudinal section of a connection embodying my invention which is adapted to be incorporated in that portion of the actuating mechanism for the front wheel brakes; and Fig. 3 is a view similar to Fig. 1 and illustrating a connection embodying my invention which is adapted to be incorporated in that portion of the actuating mechanism for the rear wheel brakes.

Referring specifically to the drawing in which similar reference characters designate similar parts in each of the several views, my invention in its present embodiment is shown associated with a set of internal expanding brakes, the pair of front wheel brakes being designated generally at 10 and $10^a$ respectively, while the pair of rear wheel brakes are designated generally at 11 and $11^a$ respectively.

These brakes may be of any conventional form, and a detailed description thereof is deemed unnecessary to a clear explanation of my invention, it being sufficient to state that suitably mounted at the front wheel brakes 10 and $10^a$ are arms 12 and $12^a$ respectively, which when rocked in the direction of the arrows actuate the braking mechanism to apply the brakes, while suitably mounted at the rear wheel brakes 11 and $11^a$ respectively are arms 13 and $13^a$ which when rocked in the direction of the arrows actuate the braking mechanism to apply the brakes.

The arms 12, $12^a$, 13, and $13^a$ are adapted to be actuated from a common actuating means comprising a rock shaft 14 suitably journaled in the chassis of the vehicle (not shown) and having fixed thereto a normally elevated pedal 15 capable of being depressed by the operator. Also fixed to the shaft 14 are a pair of arms 16 and 16ª and a second pair of arms 17 and 17ª.

The braking mechanism thus far described is all of conventional construction, and to provide operative connections between the arms 12 and 16 and the arms 12ª and 16ª so that a depression of the pedal 15 can only transmit to the arms 12 and 12ª a predetermined operating force equivalent to a service application insufficient to cause the front wheel brakes 10 and 10ª to grab or lock, I provide means which in the present instance comprises a pair of connections designated generally at C and C', which are identical in construction so that a description of one will suffice.

Referring now to Fig. 2, the connection C is illustrated as comprising a metal barrel B having secured thereto at one end a rod section 18, and open at its other end to receive a second rod section 19 having a head 20. The open end of the barrel B is internally threaded and closed by a threaded plug 21 having an opening therethrough slidably receiving the rod section 19. Surrounding the rod section 19 is a coiled expansible spring 22 interposed between the head 20 and plug 21 so as to normally urge the rod section 19 inwardly of the barrel.

The rod sections 18 and 19 of one of the two connections C and C' above described are of suitable lengths for connection to the free ends of the arms 12 and 16 respectively, while the rod sections 18 and 19 of the other of the two connections are connected to the free ends of the arms 12ª and 16ª respectively, all as clearly shown in Fig. 1.

To provide operative connections between the arms 13 and 17 and the arms 13ª and 17ª so that a depression of the pedal 15 will initially transmit an operating force to the arms 13 and 13ª sufficient in equivalency to a service application, and that upon continued depression of the pedal an operating force transmitted to the arms 13 and 13ª sufficient to effect an emergency application, I provide means which in the present instance comprises a pair of connections designated at C² and C³, identical to the connections C and C' previously described with the exception of a means in the barrels B thereof which constitutes an abutment or stop, reference being had to Fig. 3 illustrating one of the two connections C² and C³.

In the present instance, this stop comprises a tubular member 23 loosely surrounding the rod section 19ª of a connection C² or C³ between its head 20ª and the plug 21ª, and of such length as to permit of only a limited outward movement of the rod section 19ª against the normal action of the spring 22ª, after which continued outward movement of the rod section 19ª will result in a corresponding movement being positively transmitted to the barrel B' and hence to the rod section 18ª.

It will be understood that the rod sections 18ª and 19ª of one of the two connections C² and C³ are of suitable lengths for connection to the free ends of the arms 13 and 17 respectively, and the rod sections 18ª and 19ª of the other of the two connections, for connection to the free ends of the arms 13ª and 17ª respectively, all of which is clearly shown in Fig. 1.

In the operation of the actuating mechanism above described it will be clear that when a braking application is to be effected, the initial depression of the pedal 15 will result in pulling forces being exerted upon the rod sections 19 of the connections C and C' and upon the rod sections 19ª of the connections C² and C³ to thereby exert yielding pulls upon the rod sections 18 and 18ª of the respective connections through the medium of the respective springs 22 and 22ª which are compressed during this operation. Operating forces are thus transmitted to the arms 12, 12ª, 13, and 13ª to rock them in the direction of their respective arrows to gradually and uniformly apply the brakes 10, 10ª, 11, and 11ª and thus effect a service application of all of the brakes.

However, upon continued depression of the pedal 15, the springs 22ª of the connections C² and C³ will become compressed to such extent that the heads 20ª of the rod sections 19ª will engage the tubular members 23 thus preventing further compression of the springs 22ª to form a solid connection between the rod sections 19ª and 18ª, so that upon further depression of the pedal 15 the arms 13 and 13ª will be positively actuated to effect an emergency application only of the rear wheel brakes 11 and 11ª. During such an emergency application, the springs 22 of the connections C and C' will continue to be further compressed but will maintain a yieldable connection between the pedal 15 and the arms 12 and 12ª, the strength of the springs being such that the maximum operating force to which the arms 12 and 12ª are subjected is insufficient to cause the front wheel brakes to grab or lock, thereby reducing to a minimum the possibility of skidding or overturning of the automobile when effecting a braking application in an emergency, yet permitting a maximum braking action consistent with safety.

It will be appreciated that the pairs of springs 22 and 22ª operate to produce a differential movement between the pedal 15 constituting a common operating means, and the arms 12, 12ª, 13 and 13ª, each of which comprises an actuating means for a brake, in response to initial depression of the pedal, to cause a lagging movement of the arms with respect to the pedal; the differential movement gradually decreasing under continued movement of the pedal due to the increasing resistance of the spring against compression, to thus effect a uniform service application of all of the brakes.

Further depressing movement of the pedal results in a rapid decrease of the differential movement to zero with respect to the arms 13 and 13$^a$ of the rear wheel brakes 11 and 11$^a$, as the tubular stop members 23 are engaged by the heads 20$^a$ of the rear wheel brake connections C$^2$ and C$^3$, thus eliminating the prior yielding connection and substituting a solid connection to positively operate the rear wheel brakes and produce an emergency application thereof independent of the front wheel brakes and while maintaining a service application of the latter brakes.

Although I have herein shown and described only one form of brake actuating mechanism embodying my invention it is to be understood that various changes and modifications may be made therein without departing from the spirit of the invention and the spirit and scope of the appended claims.

I claim:

1. A four wheel brake mechanism comprising actuating means for the front and rear wheel brakes respectively, manually actuated operating means for the actuating means, and means operatively connecting the operating means with the actuating means by which an emergency application of the rear wheel brakes can be effected while effecting only a service application of the front wheel brakes, the last means comprising connections yieldable under movement of the operating means to produce a differential movement between the operating means and the actuating means to cause lagging movement of the actuating means with respect to the operating means and which differential movement gradually decreases under continued movement of the operating means to produce a service application of all of the brakes, and means for causing rapid decrease of the differential movement to zero in respect to the actuating means for the rear wheel brakes after a service application is effected to produce an emergency application of the rear wheel brakes independently of the front wheel brakes.

2. A four wheel brake mechanism comprising actuating means, one for each of the front and rear wheel brakes respectively, a common manually actuated operating means for the actuating means, yieldable connections between the operating means and the actuating means of all of the brakes, by which a service application of all of the brakes can be effected in response to a predetermined movement of the operating means, and means operable in response to continued movement of the operating means to render the yieldable connections between the operating means and the actuating means of the rear wheel brakes unyieldable and thereby positively operate the rear wheel brakes to effect an emergency application thereof while maintaining a service application of the front wheel brakes through the medium of the yieldable connection thereto.

3. A four wheel brake mechanism comprising actuating means, one for each of the front and rear wheel brakes respectively, a common manually actuated operating means for the actuating means, resilient means operatively connecting the operating means and the actuating means of all of the brakes, by which a service application of all of the brakes can be effected in response to a predetermined movement of the operating means, and means operable in response to continued movement of the operating means to render the resilient means between the operating means and the actuating means of the rear wheel brakes ineffective and to produce a solid operative connection by which the rear wheel brakes are positively operated to effect an emergency application while maintaining a service application of the front wheel brakes through the medium of the resilient means therefor.

4. A four wheel brake mechanism as embodied in claim 2 wherein the yieldable connection for the actuating means for the brakes each comprises a barrel, a plunger slidable in the barrel, one of the two being operatively connected to the operating means and the other to the actuating means, and a spring in the barrel interposed between the latter and plunger, and the means for rendering unyieldable, the yieldable connections between the operating means and the actuating means for the rear wheel brakes comprising a stop member in the barrel of the yieldable connection to the rear wheel brakes, for limiting movement of the plunger in the barrel against the normal action of the spring.

5. A four wheel brake actuating mechanism as embodied in claim 2 wherein the yieldable connections for the actuating means for the brakes each comprises a barrel, a headed rod slidable in the barrel, one of the two being operatively connected to the operating means and the other to the actuating means, and a coil spring in the barrel surrounding the rod for engagement with its head and an end of the barrel, and the means for rendering unyieldable, the yieldable connections between the operating means and the actuating means for the rear wheel brakes comprising a tubular stop member in the barrel of the yieldable connection to the rear wheel brakes, the tubular stop member surrounding the respective rod and adapted to be engaged by the head thereof in response to a predetermined movement of the rod against the normal action of the respective spring.

6. A four wheel brake actuating mechanism comprising actuating means for the front and rear wheel brakes respectively, operating means for the actuating means, means operatively connecting the actuating means for both the front and rear wheel brakes with the operating means, by which an operating force increasing to a maximum insufficient to lock the brakes is transmitted to the actuating means in response to a predetermined movement of the operating means, to thereby effect a service application of all the brakes, and means operable in response to movement of the operating means in excess of said predetermined movement, by which a second operating force in excess of the first mentioned operating force is positively transmitted to the actuating means for the rear wheel brakes only, to thereby effect an emergency application of the rear wheel brakes while maintaining a service application of the front wheel brakes.

7. A four wheel brake actuating mechanism comprising actuating means for the front and rear wheel brakes respectively, operating means for the actuating means, resilient connections between the operating means and actuating means for both the front and rear wheel brakes, by which a yielding operating force increasing to a maximum insufficient to lock the brakes, is transmitted to the actuating means in response to a predetermined movement of the operating means, to thereby effect a service application of all the brakes, and means operable in reponse to movement of the operating means in excess of said predetermined movement, by which a second and positive operating force in excess of the first mentioned operating force is caused to be transmitted to only the actuating means for the rear wheel brakes, to thereby effect an emergency application of the rear wheel brakes while maintaining a service application of the front wheel brakes.

8. A four wheel brake actuating mechanism as embodied in claim 7 wherein the resilient connections each comprises a barrel, a plunger slidable in the barrel, one of the two being operatively connected to the operating means and the other to the actuating means, and a spring in the barrel for opposing movement of the plunger in one direction, and the means for rendering unyieldable, the yieldable connections between the operating means and the actuating means for the rear wheel brakes comprising a stop member in the barrel of the resilient connection to the rear wheel brakes, for limiting movement of the plunger in the barrel against the normal action of the spring in the barrel.

9. A four wheel brake actuating mechanism as embodied in claim 7 wherein the resilient connections each comprises a barrel, a headed rod slidable in the barrel, one of the two being operatively connected to the operating means and the other to the actuating means, and a coil spring in the barrel surrounding the rod and interposed between its head and the barrel, and the means for rendering unyieldable, the yieldable connections between the operating means and the actuating means for the rear wheel brakes comprising a tubular stop member in the barrel of the yieldable connection to the rear wheel brakes, the tubular stop member surrounding the respective rod and adapted to be engaged by the head thereof in response to a predetermined movement of the rod against the normal action of the respective spring.

10. In combination with pairs of front and rear wheel brakes, operating means common to all of the brakes, means operatively connecting the operating means and front wheel brakes, by which brake applying movement of the operating means to effect service and emergency applications is yieldingly transmitted to the front wheel brakes, and means operatively connecting the operating means and rear wheel brakes, by which brake applying movement of the operating means to effect a service application is yieldingly transmitted to the rear wheel brakes, and brake applying movement of the operating means to effect an emergency application, positively transmitted to the rear wheel brakes.

11. In combination with pairs of front and rear wheel brakes, an actuating means for each of the brakes, operating means common to all of the actuating means, means by which an operating force, increasing to a maximum insufficient to lock the front wheel brakes, is transmitted to the actuating means therefor in response to movement of the operating means in effecting both service and emergency applications, means by which an operating force, increasing to a maximum insufficient to lock the rear wheel brakes is transmitted to the actuating means therefor in response to movement of the operating means in effecting a service application, and means by which a second force in excess of said maximum is positively transmitted to the actuating means of the rear wheel brakes in response to movement of the operating means in effecting an emergency application, whereby an emergency application of the rear wheel brakes will be effected while maintaining a service application of the front wheel brakes.

12. A four wheel brake actuating mechanism comprising operating means for the front and rear wheel brakes, means operatively connecting the operating means and front wheel brakes, by which brake applying movement of the operating means to effect service and emergency applications is yieldingly transmitted to the front wheel brakes, and means operatively connecting the operating means and rear wheel brakes, by which brake applying movement of the operating means to effect a service application is yieldingly transmitted to the rear wheel brakes, and brake applying movement of the operating means to effect an emergency application, positively transmitted to the rear wheel brakes.

Signed at Los Angeles, in the county of Los Angeles and State of California, this 28th day of May, A. D. 1928.

EDWIN A. HARDISON.